(12) United States Patent
Nielsen

(10) Patent No.: US 10,779,465 B2
(45) Date of Patent: Sep. 22, 2020

(54) CARRIER ASSEMBLY

(71) Applicant: Kverneland Group Kerteminde AS, Kerteminde (DK)

(72) Inventor: Rasmus Elmelund Nielsen, Gudbjerg (DK)

(73) Assignee: KVERNELAND GROUP KERTEMINDE AS, Kerteminde (DK)

( * ) Notice: Subject to any disclaimer, the term of this patent is extended or adjusted under 35 U.S.C. 154(b) by 274 days.

(21) Appl. No.: 15/766,922

(22) PCT Filed: Sep. 26, 2016

(86) PCT No.: PCT/EP2016/072878
§ 371 (c)(1),
(2) Date: Apr. 9, 2018

(87) PCT Pub. No.: WO2017/060116
PCT Pub. Date: Apr. 13, 2017

(65) Prior Publication Data
US 2018/0295774 A1 Oct. 18, 2018

(30) Foreign Application Priority Data
Oct. 9, 2015 (EP) .................................... 15189092

(51) Int. Cl.
*A01D 34/66* (2006.01)
*A01D 34/86* (2006.01)
(Continued)

(52) U.S. Cl.
CPC ......... *A01D 34/661* (2013.01); *A01D 34/006* (2013.01); *A01D 34/74* (2013.01); *A01D 34/866* (2013.01); *A01D 2101/00* (2013.01)

(58) Field of Classification Search
CPC .. A01B 73/005; A01D 34/866; A01D 34/661; A01D 34/06; A01D 34/74; A01D 67/005; A01D 34/006
(Continued)

(56) References Cited

U.S. PATENT DOCUMENTS 3,221,482 A * 12/1965 Cowling ............... A01D 34/866
56/15.8
3,949,539 A 4/1976 Cartner
(Continued)

FOREIGN PATENT DOCUMENTS

DE 2922495 A1 2/1980
DE 4139661 C1 2/1993
(Continued)

OTHER PUBLICATIONS

International Search Report issued for PCT Application No. PCT/EP2016/072878, dated Dec. 15, 2016.

*Primary Examiner* — Robert E Pezzuto
(74) *Attorney, Agent, or Firm* — Steven M. Shape; Dennemeyer & Associates, LLC

(57) ABSTRACT

A carrier assembly for an operating unit of an agricultural machine includes a carrier arm, a suspension system for suspending an operating unit from the carrier arm and a mounting structure for mounting the carrier arm on a carrier vehicle. A pivot mechanism enables pivoting movement of the carrier arm relative to the mounting structure, and a first actuator drives pivoting movement of the carrier arm between a working position and a transport position. The carrier assembly includes a releasable locking mechanism for locking the carrier arm in the transport position. The locking mechanism includes a first locking element carried by the mounting structure and a second locking element carried by the carrier arm, which is engageable with the first
(Continued)

locking element when the carrier arm is in the transport position.

20 Claims, 11 Drawing Sheets

(51) Int. Cl.
*A01D 34/00* (2006.01)
*A01D 34/74* (2006.01)
*A01D 101/00* (2006.01)

(58) Field of Classification Search
USPC ...... 56/14.7, 15.2, 15.9, 13.6; 414/543, 694, 414/695
See application file for complete search history.

(56) References Cited

U.S. PATENT DOCUMENTS

| | | | | |
|---|---|---|---|---|
| 4,183,195 A | * | 1/1980 | James | A01D 34/246 |
| | | | | 56/10.4 |
| 4,206,580 A | * | 6/1980 | Truax | A01D 34/866 |
| | | | | 56/10.4 |
| 5,396,754 A | * | 3/1995 | Fraley | A01D 34/863 |
| | | | | 56/15.2 |
| 2003/0041580 A1 | | 3/2003 | Ewanochko | |

FOREIGN PATENT DOCUMENTS

| | | |
|---|---|---|
| EP | 2644015 A2 | 10/2013 |
| GB | 2119618 A | 11/1983 |
| WO | 2015097230 A1 | 7/2015 |

* cited by examiner

CARRIER ASSEMBLY

CROSS-REFERENCE TO RELATED APPLICATIONS

This is a 35 U.S.C. 371 National Stage Patent Application of International Application No. PCT/EP2016/072878, filed Sep. 26, 2016, which claims priority to European application 15189092.8, filed Oct. 9, 2015, each of which is hereby incorporated by reference in its entirety.

The present invention relates to a carrier assembly for an operating unit of an agricultural machine. In an embodiment the invention relates to a carrier assembly for a cutter unit of an agricultural mowing machine. The invention also relates to an agricultural machine comprising a carrier vehicle, a carrier assembly for an operating unit and, optionally, an operating unit.

More generally, embodiments of the invention relate a carrier assembly for the operating units of various kinds of agricultural machine including, but not limited to, mowing machines, rakes, tedders, seeding machines and soil working machines, including disc harrows and cultivators. Further embodiments of the invention relate to a carrier assembly for an operating unit of an agricultural machine, where the operating unit is a cutter unit, a rake, a tedder, a seeding machine or a soil working machine.

A known type of agricultural mowing machine that may be used for harvesting hay, straw and similar crops has a cutter unit comprising a plurality of rotary cutter heads attached to a cutter bar. The cutter heads rotate about vertical axes and are provided with cutter blades that cut the crop. The rotary cutter heads may be of the disc-type or drum-type. The mowing machine may be a conditioning mowing machine that includes a plurality of flails for conditioning the cut crop, or a plain mowing machine that has no conditioning unit.

The operating unit may be carried by a carrier vehicle, for example a tractor. In the case of an agricultural mowing machine cutter units may be mounted on one or both sides of the carrier vehicle, each cutter unit being carried by a carrier assembly that is attached to the rear of the carrier vehicle and includes a carrier arm. The carrier assembly may include a pivot mechanism that allows the position of the carrier arm to be adjusted. The carrier arm may for example be located in a substantially horizontal working position in which the cutter unit is positioned close to the ground to cut the crop, or an upright transport position in which the cutter unit is lifted behind the cab of the vehicle, allowing the vehicle to travel along a road. It may also be possible to raise the carrier arm and the cutter unit to a headland position in which the cutter unit is lifted a small distance above the working position, allowing the tractor to turn when it reaches the headland.

Other types of agricultural machine including rakes, tedders, seeding machines and soil working machines may be mounted in a similar manner with an operating unit (a rake, tedder, seeding machine or soil working machine) mounted on one or both sides of a carrier vehicle and carried by a carrier assembly that is attached to the rear of the carrier vehicle and includes a carrier arm. Again, the carrier assembly may include a pivot mechanism that allows the position of the carrier arm to be adjusted. The carrier arm may be located in a working position in which the operating unit is positioned close to the ground or a transport position in which the operating unit is lifted behind the cab of the carrier vehicle, allowing the carrier vehicle to travel along a road. The carrier arm or the operating unit may also be raised to a headland position in which the operating unit is lifted a small distance above the working position, allowing the carrier vehicle to turn when it reaches the headland.

A mowing machine of the general type described above is disclosed in DE29614199U1. A cutter unit is suspended from the end of a carrier arm through a pivot joint, which is located centrally between the ends of the cutter unit. The pivot joint has a pivot axis that extends parallel to the working direction of the mowing machine and the cutter unit can rotate about this axis during use, allowing it to follow the contours of the ground. The carrier arm can be lifted from the cutting position to a travelling position in which the cutter unit is carried behind the tractor.

A disadvantage with the mowing machine described in DE29614199U1 is that it does not allow for sideshift (sideways movement of the mowing unit) relative to the axis of the tractor. Sideshift may be useful either when setting the machine up, for example to provide different operating widths, or to allow lateral adjustment of the cutter unit relative to the tractor during mowing, for example to ensure a constant overlap with a previously cut strip.

Also, if the cutter unit strikes an obstacle on the ground during a mowing operation this can cause the cutter unit to twist about a substantially vertical axis, placing a strain on the pivot joint and possibly leading to damage or failure of the pivot mechanism. The problem is particularly acute if the cutter unit strikes an obstacle near to one of its ends.

Also, it is not possible to adjust the height of the cutter unit relative to the carrier arm. Therefore, when working on uneven ground any vertical movement of the cutter unit relative to the tractor has to be accommodated by movement of the carrier arm, which places significant loads on any energy accumulators (for example springs or hydraulic bladders) associated with the arm.

WO2015/097230A1 describes an agricultural machine comprising an operating unit and a carrier assembly for the operating unit, the carrier assembly including a carrier arm and a suspension system by which the operating unit is suspended from the carrier arm, the suspension system comprising a four-bar linkage.

The carrier assembly described in WO2015/097230A1 overcomes many of the problems associated with the mowing machine described in DE29614199U1. The suspension system allows the operating unit to be suspended solely from its centre point, thus permitting pendular movement of the operating unit about the pivot point and allowing the operating unit to follow the contours of the ground. The suspension system is also much stronger and less vulnerable to damage from striking obstacles on the ground than the simple pivot used in the mowing machine described in DE 29614199U1.

The carrier assembly also allows the position of the operating unit to be adjusted laterally relative to the tractor, for example by adjusting the length of a telescopic carrier arm. By adjusting the lateral position of the operating unit while negotiating a curve, the risk of leaving untreated areas of ground can be avoided.

The suspension system allows the height of the operating unit relative to the arm to change, this movement being accommodated by a single actuator or spring. Vertical movement of the operating unit, as caused for example by movement over uneven ground, can thus be accommodated without adjusting any energy accumulators associated with the carrier arm, regardless of the length of the arm. The suspension system operates independently of any mechanism for adjusting the position or length of the carrier arm, thereby simplifying operation of the machine.

The suspension system also allows the height of the operating unit relative to the arm to be adjusted, for example by means of an actuator, which can be located centrally on the rotation axis so that it does not affect pendular motion of the operating unit when working.

Although the carrier assembly described in WO2015/097230A1 overcomes many of the problems associated with the mowing machine described in DE29614199U1, it is still possible to identify one or more problems or possible areas of improvement in that carrier assembly. For example, the carrier assembly of WO2015/097230A1 is mechanically relatively complex, which affects its manufacturing cost. When the carrier assembly is in the working position the carrier arm must be substantially horizontal to maximise the travel distance of the suspension system. However, if for example a tyre of the carrier vehicle partially deflates this may cause the arm to tilt, thereby reducing the travel distance of the suspension system. Also, the carrier assembly described in WO2015/097230A1 does not have a mechanism for locking the carrier arm in the upright transport position.

It is an object of the present invention to provide a carrier assembly for an operating unit of an agricultural machine that mitigates one or more of the problems associated with the carrier assembly described in WO2015/097230A1, or that provides one or more improvements over that carrier assembly.

According to one aspect of the present invention there is provided a carrier assembly for an operating unit of an agricultural machine, the carrier assembly including a carrier arm, a suspension system for suspending an operating unit from the carrier arm, a mounting structure for mounting the carrier arm on a carrier vehicle, a pivot mechanism that enables pivoting movement of the carrier arm relative to the mounting structure, and a first actuator that drives pivoting movement of the carrier arm between a working position and a transport position, wherein the carrier assembly further includes a releasable locking mechanism for locking the carrier arm in the transport position, the locking mechanism including a first locking element carried by the mounting structure and a second locking element carried by the carrier arm, which is engageable with the first locking element when the carrier arm is in the transport position.

The locking mechanism enables the carrier arm to be locked in the transport position, so that the arm cannot fall down during transportation if, for example, the hydraulic pressure is lost in a hydraulic drive system for the actuator that drives pivoting movement of the carrier arm. The safety of the system is thus improved.

The pivot mechanism enables movement of the carrier arm between a working position and a transport position in which the operating unit is located behind the cab of the carrier vehicle. The carrier assembly includes a drive mechanism for driving pivoting movement of the carrier arm, allowing it to be moved easily between the different positions. The pivot mechanism is configured to provide for pivoting movement of the carrier arm between an upright position and a lowered working position in which the arm extends substantially parallel to the ground. The upright position allows the operating unit to be stowed behind the cab of the carrier vehicle for transportation along roads or through narrow gateways/doorways.

According to an embodiment, the second locking element is not engageable with the first locking element when the carrier arm is not in the transport position, thus preventing unintentional engagement of the locking mechanism for example when the carrier arm is in the working position.

The carrier arm preferably includes an inner part, an outer part that can be telescopically extended and retracted relative to the inner part, and a second actuator that drives the outer part to adjust the length of the carrier arm, allowing the position of the operating unit to be adjusted laterally relative to the carrier vehicle. This makes it possible to adjust the operating position of the cutter unit during a mowing operation, for example to ensure that the edge of the cut strip of crop is aligned correctly with the edge of a strip cut previously.

Adjustment of the lateral position of the cutter unit may be carried out manually, automatically or semi-automatically, for example using an operating method as described in EP1321027B1.

In an embodiment, the second locking element is carried by the outer part of the carrier arm and is configured to engage the first locking element when the outer part of the carrier arm is fully retracted relative to the inner part and to disengage the first locking element when the outer part of the carrier arm is extended telescopically relative to the inner part. In an embodiment, the first locking element comprises a hook element and the second locking element comprises a pin that engages the hook element. This configuration of the locking mechanism is very simple and reliable and allows the locking mechanism to engage and disengage automatically as the carrier arm is moved to and from the transport position. No additional moving parts are required, the locking mechanism being engaged and disengaged simply by retraction and extension of the outer part of the carrier arm.

In an embodiment, the first actuator is connected between a first mount that is attached to the mounting structure and a second mount that is attached to the inner part of the arm, and the second actuator is connected between the second mount and a third mount that is attached to the outer part of the arm. The use of a shared second mount that is connected to both the first actuator and the second actuator means that only three mounts are required in total for the two actuators, thus simplifying the structure of the carrier arm. The arrangement is also mechanically efficient.

According to another aspect of the present invention there is provided a carrier assembly for an operating unit of an agricultural machine, the carrier assembly including a carrier arm, a suspension system for suspending an operating unit from the carrier arm, a mounting structure for mounting the carrier arm on a carrier vehicle, a pivot mechanism that enables pivoting movement of the carrier arm relative to the mounting structure, and a first actuator that drives pivoting movement of the carrier arm between a working position and a transport position, wherein the carrier arm includes an inner part and an outer part that can be telescopically extended and retracted relative to the inner part, and a second actuator that drives the outer part to adjust the length of the carrier arm, wherein the first actuator is connected between a first mount that is attached to the mounting structure and a second mount that is attached to the inner part of the arm, and the second actuator is connected between the second mount and a third mount that is attached to the outer part of the arm.

The use of a shared second mount that is connected to both the first actuator and the second actuator means that only three mounts are required in total for the two actuators, thus simplifying the structure of the carrier arm. The arrangement is also mechanically efficient.

According to another aspect of the present invention there is provided a carrier assembly for an operating unit of an agricultural machine, the carrier assembly including a carrier arm, a suspension system for suspending an operating unit from the carrier arm, a mounting structure for mounting the carrier arm on a carrier vehicle, a pivot mechanism that enables pivoting movement of the carrier arm relative to the mounting structure, and a first actuator that drives pivoting movement of the carrier arm between a working position and a transport position, wherein the working position of the carrier arm is adjustable.

The working position of the carrier arm may be adjustable, for example by adjusting the first actuator. In an embodiment the first actuator is steplessly or pseudo-steplessly adjustable.

If the working position of the carrier arm is adjustable, as opposed for example to the working position being fixed by a mechanical stop, levelling compensation may be applied to ensure that the arm is horizontal when it is in the working position. This is important to ensure that the suspension system has a full range of movement. Adjusting the working position of the carrier arm makes it possible to compensate for any tilting of the carrier vehicle, as may be caused for example by a loss of pressure in one or more of the vehicle's tyres. The levelling compensation may be applied by adjusting the first actuator, and the first actuator may be steplessly or pseudo-steplessly adjustable to allow fine adjustment of the carrier arm's working position.

In an embodiment the pivot mechanism has a pivot axis that extends substantially parallel to the working direction of the agricultural machine.

In an embodiment the suspension system includes a mounting structure for the operating unit and two pairs of connecting rods, comprising an upper pair of connecting rods and a lower pair of connecting rods, each said connecting rod being attached via joints to the mounting structure and the carrier arm, wherein a first pair of said upper and lower pairs of connecting rods diverge in a working direction of the operating unit and a second pair of said upper and lower pairs of connecting rods converge in a working direction of the operating unit.

The suspension system allows the operating unit to be suspended solely from its centre point, thus permitting pendular movement of the operating unit and enabling the operating unit to follow the contours of the ground. The suspension system is also stronger and less vulnerable to damage from striking obstacles on the ground than the simple pivot used in the mowing machine described in DE 29614199U1.

The suspension system allows the operating unit to move vertically relative to the carrier arm. This movement may be accommodated, for example, by an actuator or spring. Vertical movement of the operating unit, as caused for example by movement over uneven ground, can be accommodated without adjusting any energy accumulators associated with the carrier arm, regardless of the length of the arm. The suspension system operates independently of any mechanism for adjusting the position or length of the carrier arm, thereby simplifying operation of the machine.

The suspension system allows the height of the operating unit relative to the arm to be adjusted, for example by means of an actuator or spring, which can be located centrally on the rotation axis so that it does not affect pendular motion of the operating unit when working.

Furthermore, when the mowing machine is raised to a transport position, the operating unit will naturally adopt a stable position under the force of gravity. The stability of the operating unit when it is in this position may be increased by the providing an actuator or spring that exerts a self-righting force on the operating unit. This actuator/spring is preferably connected to the carrier arm at a point higher than the virtual axis of rotation of the operating unit when it is in a raised position so that it increases the stability of the operating unit.

In an embodiment, the suspension system includes a support mechanism that supports the weight of the operating unit. The support mechanism may be located at the free end of the carrier arm, allowing the operating unit to move vertically relative to the arm and reducing or eliminating the need for the arm to pivot during working to accommodate undulations in the ground. This reduces the load on the energy accumulators associated with the arm and allows the energy level of the energy accumulators to be adjusted directly so as to influence the behaviour of the support mechanism, regardless of the position or length of the carrier arm.

The support mechanism may include an actuator for adjusting the height of the operating unit relative to the carrier arm. This allows the height of the operating unit to be adjusted easily, for example between a working position and a headland position, or in the case of a mowing machine between different cutting positions providing different cutting heights. Preferably, the actuator is configured to act between the carrier arm and the mounting structure of the operating unit.

The support mechanism may optionally include a resilient support element or elements configured to support at least part of the weight of the operating unit. Each resilient support element is preferably configured to act between the carrier arm and the mounting structure of the operating unit. Alternatively, the resilient support elements may be omitted and the weight of the operating unit may be supported entirely by an actuator, for example a hydraulic actuator, which may optionally be coupled to a hydraulic accumulator.

In an embodiment the upper pair of connecting rods lie in an upper plane and the lower pair of connecting rods lie in a lower plane. In one preferred embodiment a line normal to the upper plane and a line normal to the lower plane are substantially perpendicular to a width axis of the operating unit. Preferably, the upper plane is substantially parallel to the lower plane. This arrangement ensures that the operating unit is held upright and does not rotate about a horizontal axis as it moves in a vertical direction relative to the carrier arm.

The carrier assembly may be supplied with an operating unit for attachment to an existing carrier vehicle. Alternatively, the carrier assembly may be used for retrofitting to an existing operating unit.

According to another aspect of the invention there is provided an agricultural machine including a carrier assembly according to any one of the preceding statements of invention, a carrier vehicle and an operating unit, wherein the carrier assembly is mounted on the carrier vehicle and carries the operating unit. Alternatively, the carrier vehicle may carry two operating units and two carrier assemblies, mounted on both sides of the carrier vehicle.

In one preferred embodiment, the agricultural machine is a mowing machine and the operating unit is a cutter unit. The cutter unit preferably includes a plurality of rotary cutter heads mounted on a cutter bar or support frame.

An embodiment of the invention will now be described by way of example with reference to the accompanying drawings, in which.

Figure 1:
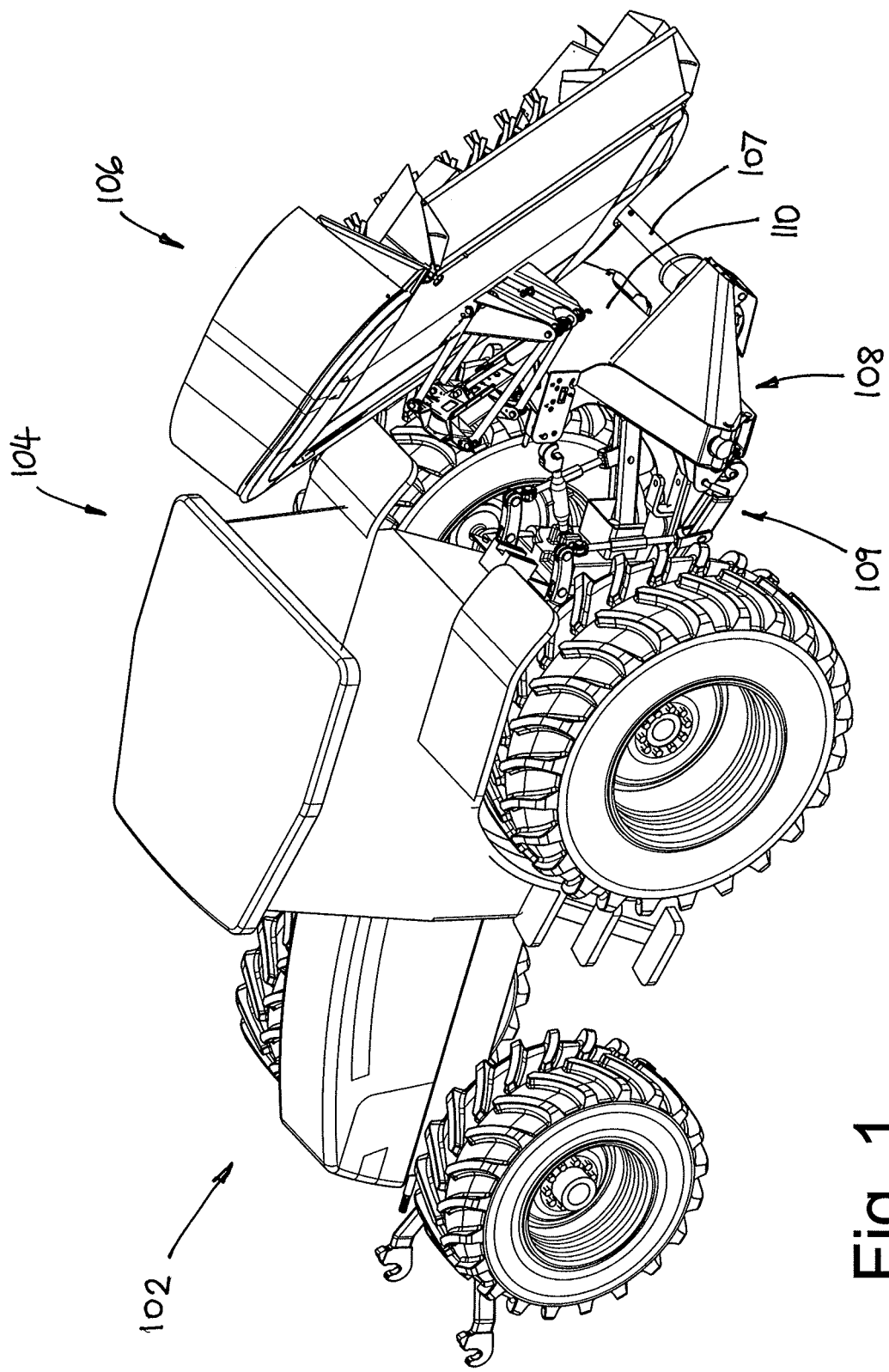
FIG. 1 is an isometric view of a mowing machine that includes a carrier assembly according to an embodiment of the invention, a carrier vehicle and a cutter unit, shown in a transport position.
Figure 2:
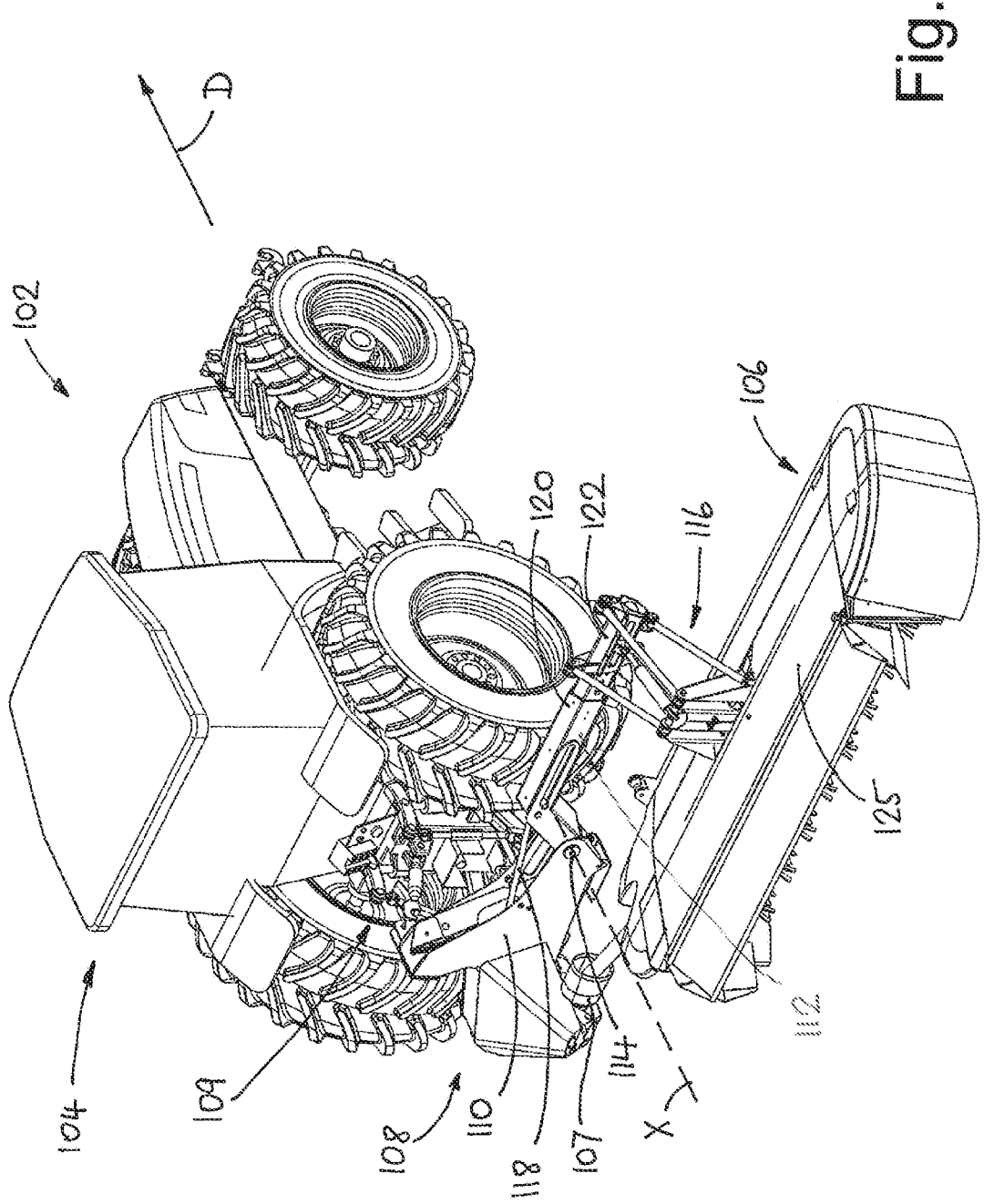
FIG. 2 is an isometric view of the mowing machine of FIG. 1, with the carrier assembly shown in a working position.

FIGS. 1 and 2 depict an agricultural machine 102 comprising a carrier vehicle (or tractor) 104, an operating unit 106 and a carrier assembly 108, which is attached to the rear of the carrier vehicle 104 through a conventional three-point mounting system 109. In this embodiment the agricultural machine 102 is a mowing machine, the carrier vehicle 104 is a tractor, and the operating unit 106 is a cutter unit. It should be understood however that the invention is also applicable to other kinds of agricultural machine including rakes, tedders, seeding machines and soil working machines, in which the cutter unit 106 is replaced by another operating unit of an appropriate type. The operating unit 106 is driven from the power take off of the vehicle 104 through a drive shaft 107.

The carrier assembly 108 includes a mounting structure 110 that is attached to the tractor's three-point mounting system 109, a carrier arm 112 that is attached to the mounting structure 110 through a pivot mechanism 114, and a suspension system 116 through which the cutter unit 106 is suspended from the free end of the carrier arm 112. In this embodiment the carrier arm 112 includes an inner section 112a that is connected to the pivot 114 and an outer section 112b that extends outwards to the free end of the arm and is set at an angle of about 40° relative to the inner section 112a.

The pivot mechanism 114 allows the carrier arm 112 to be pivoted about a pivot axis X that extends substantially parallel to the working direction D of the cutter unit 106. An actuator 118, for example a hydraulic ram, can be activated to drive rotation of the carrier arm 112 about the pivot axis X. The carrier arm 112 can generally be pivoted through a pivot angle in the range approximately 120° to 150° between a working position in which the outer section 112b of the arm is substantially horizontal, and a substantially upright transport position.

Figure 3:
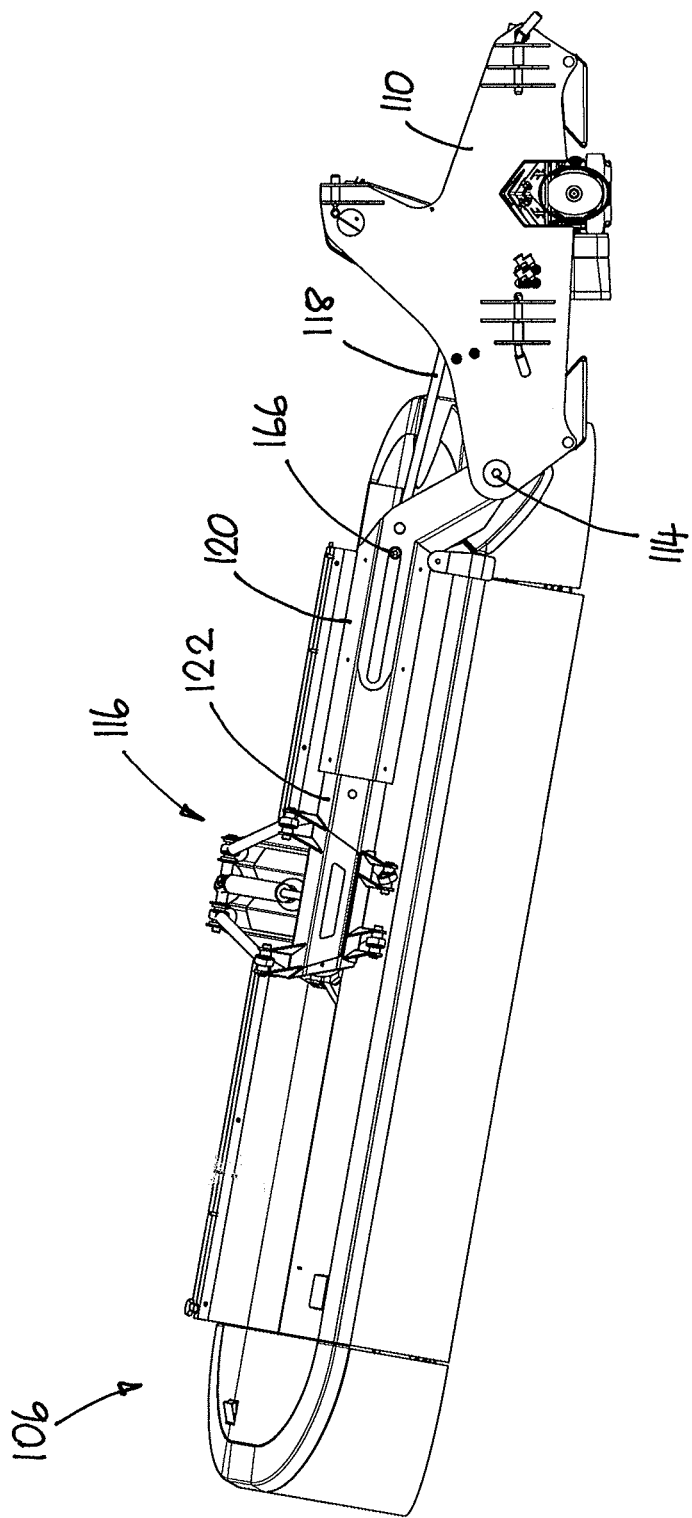
FIG. 3 is a front view of the carrier assembly and the cutter unit, shown in a headland position.

In FIG. 1 the mowing machine is shown in a transport configuration in which the carrier arm 112 is lifted to an upright position so that the cutter unit 106 is located behind the cab of the tractor 104, while in FIG. 2 the carrier arm 112 is shown in a working position in which the outer section 12b of the carrier arm 112 and the cutter unit 106 are substantially parallel to the ground. In FIG. 3 the carrier arm 112 is shown in a headland position in which the cutter unit 106 is raised slightly above the working position. The cutter unit 106 is moved to the headland position by raising the carrier arm 112 slightly, for example through a pivot angle of about 15°, and at the same time lifting the cutter unit 106 relative to the carrier arm 112 by adjusting the suspension system 116. This is described in more detail below.

Figure 4:
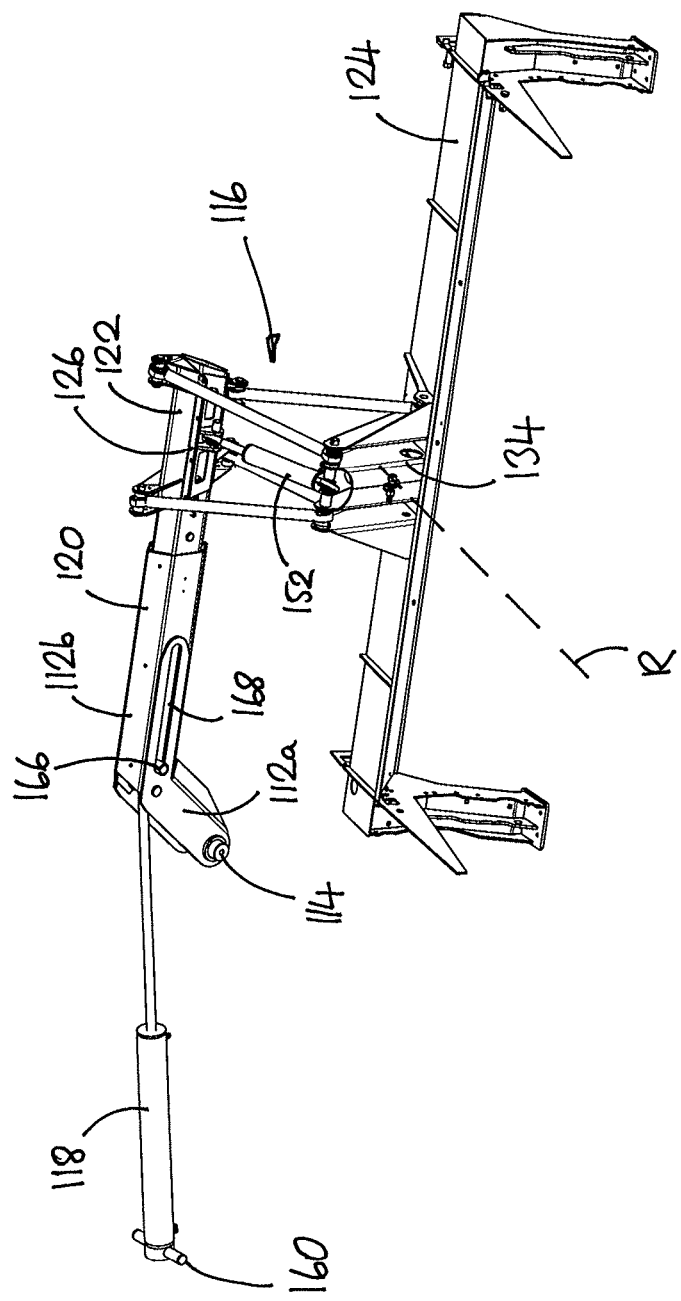
FIG. 4 is an isometric view of the carrier assembly.
Figure 6:
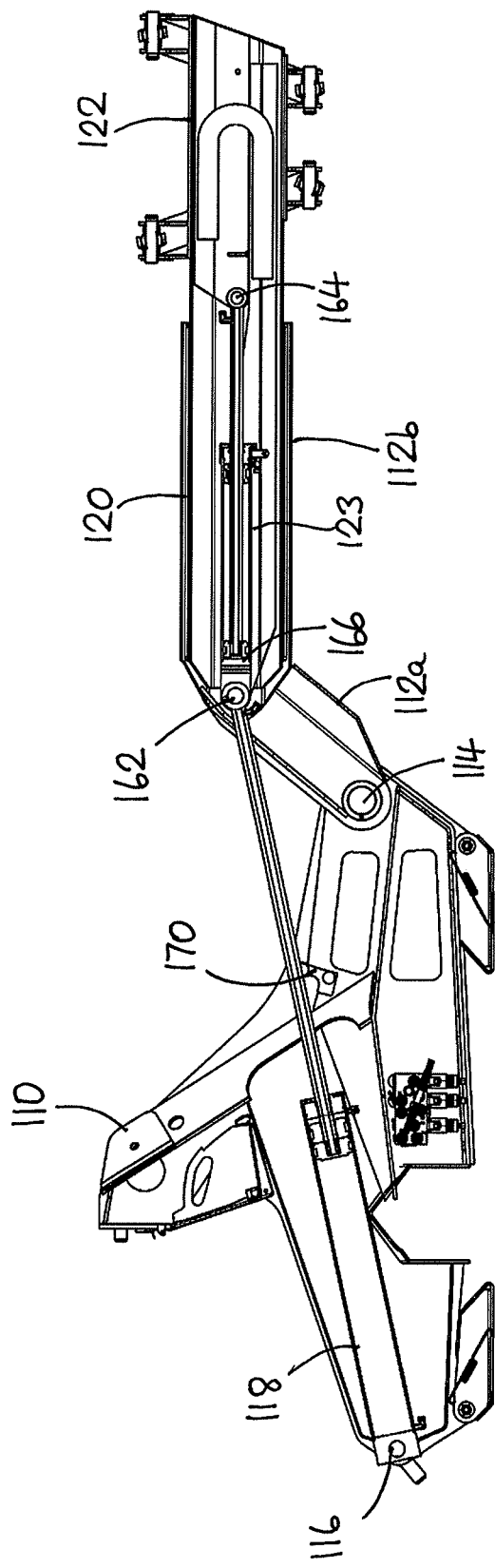
FIG. 6 is a sectional view of the carrier assembly, shown in a working condition.
Figure 8:
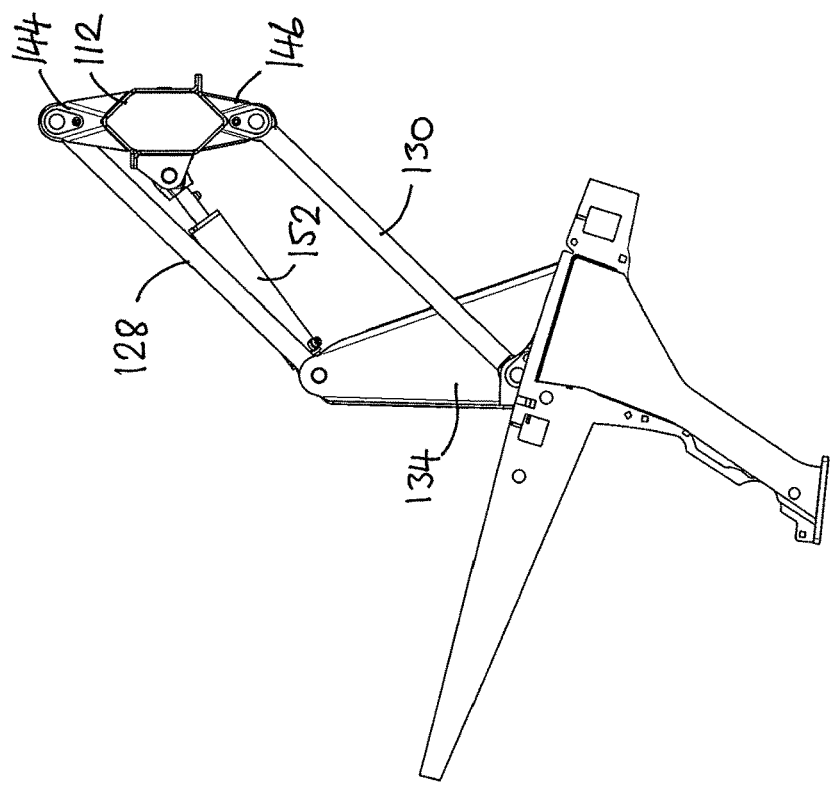
FIG. 8 is a side view of the suspension system, shown in a lowered condition.
Figure 7:
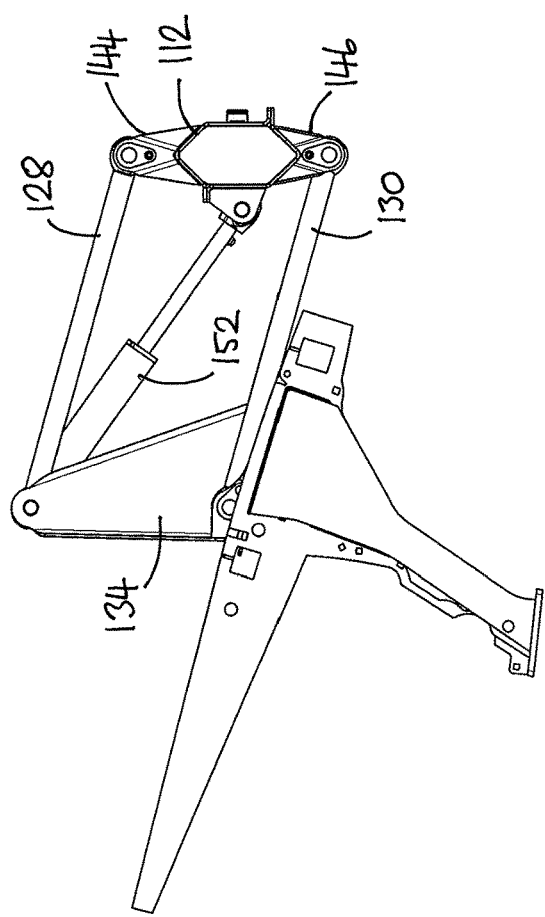
FIG. 7 is a side view of the suspension system, shown in a raised condition.
Figure 9:
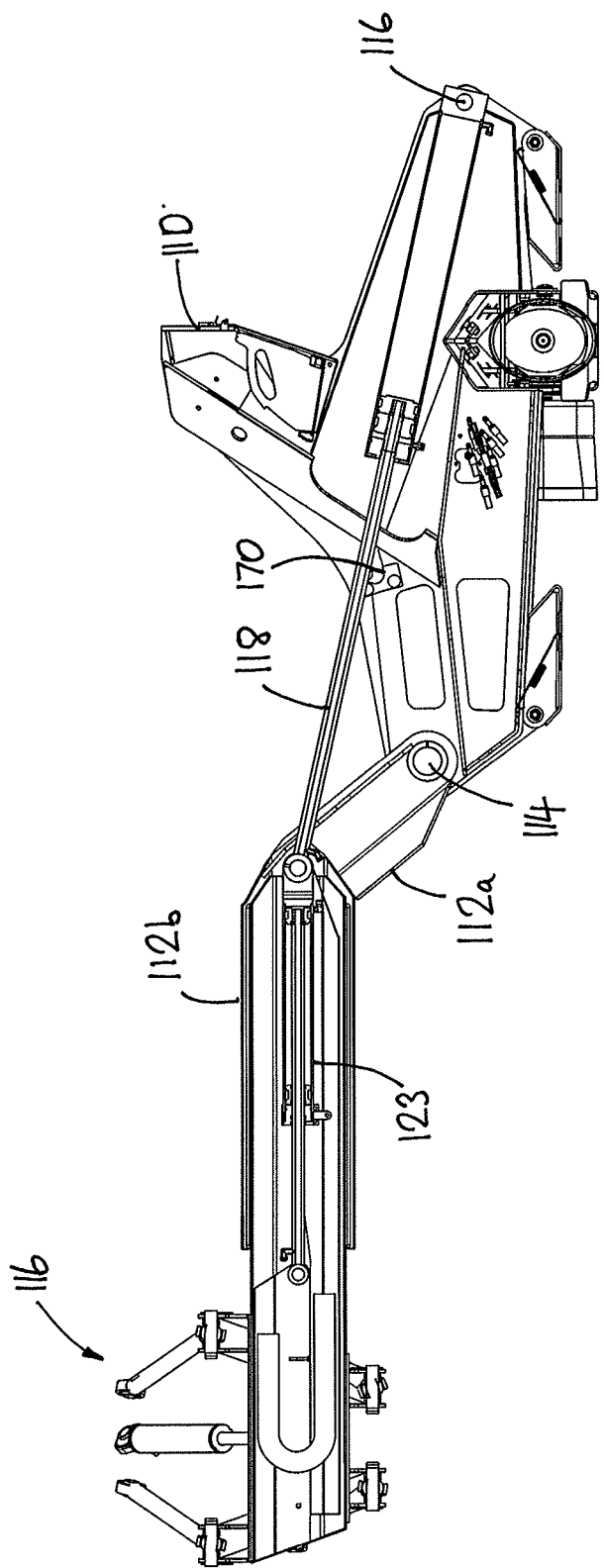
FIG. 9 is a sectional front view showing part of the carrier assembly in a working condition.

As shown in FIGS. 4 and 6, the outer section 112b of the carrier arm includes an inner part 120 and an outer part 122 that can be extended telescopically relative to the inner part 120 to adjust the lateral position of the cutter unit 106 relative to the tractor 104. Telescopic extension and retraction of the outer section is controlled by an actuator 123, for example a hydraulic ram, which is located within the inner part 120 of the carrier arm 112. The telescopic carrier arm 112 thus allows for sideshift movement of the cutter unit 106 relative to the tractor 104. This allows the operating position of the cutter unit 106 to be adjusted laterally relative to the centreline of the tractor 104. This makes it possible to adjust the operating position of the cutter unit 106 during a mowing operation, for example to ensure that the edge of the cut strip of crop is aligned correctly with the edge of a strip that has been cut previously, or to adjust the amount of overlap between the two strips. Adjustment of the lateral position of the cutter unit 106 may be carried out manually, automatically or semi-automatically, for example using an operating method as described in EP1321027B1.

The cutter unit 106 is largely conventional and includes a plurality of cutter heads (not shown) attached to a support frame 124, and an optional conditioning unit 125 for conditioning the crop cut by the cutter heads. The cutter unit 106 is driven via a drive shaft 107 from the power take-off unit of the tractor 104.

The cutter unit 106 is suspended from the free end of the carrier arm 112 by the suspension system 116, which is shown most clearly in FIGS. 4, 5, 7 and 8. The suspension system 116 includes a bracket 126 that is attached to the free end of the carrier arm 112, and two pairs of connecting rods, comprising a pair of upper connecting rods 128 and a pair of lower connecting rods 130. The connecting rods 128, 130 all extend approximately in the working direction D of the mowing machine and are attached at their front ends via ball joints 132 to the carrier arm 112.

The rear end of each connecting rod 128,130 is attached via a spherical ball joint 132 to a mounting structure 134 that extends upwards from the support frame 124 of the cutter unit 106 and is located approximately centrally with respect to the working width of the cutter unit. In this embodiment the mounting structure 134 includes two pairs of tall inner plates 136 that are connected to the upper connecting rods 128 and two pairs of shorter outer plates 138 that are connected to the lower connecting rods 130. The ball joints 132 at the rear ends of the connecting rods 128,130 lie in a first plane referred to herein as the mo-unit plane. The ball joints 132 at the rear ends of the upper connecting rods 128 are positioned more closely together than the ball joints 132 at the rear ends of the lower connecting rods 130.

The forward end of each connecting rod 128, 130 is attached via a second spherical ball joint 132 to a second mounting structure 142 provided on the bracket 126 that is attached to the free end of the carrier arm 112. In this embodiment the second mounting structure 142 includes two pairs of upper plates 144 provided on the upper part of the carrier arm 112 and two pairs of lower plates 146 provided on the lower part of the carrier arm 112. Each of the connecting rods 128, 130 is connected to one of these plates via a second ball joint 132. The second ball joints 132 lie in a second plane referred to herein as the frame plane.

The ball joints at the forward ends of the lower connecting rods 130 are positioned more closely together than the ball joints at the forward ends of the upper connecting rods 128.

The connecting rods 128, 130 form a pair of four-bar linkages, which control movement of the cutter unit 106 relative to the carrier arm 112. In this embodiment the upper connecting rods 128 lie in an upper plane and the lower connecting rods lie in a lower plane, which is parallel to the upper plane. This arrangement allows the cutter unit 106 to move substantially vertically relative to the carrier arm 112 while maintaining the cutter unit in an upright position (i.e. without rotation of the cutter unit about a horizontal axis). Alternatively, the upper and lower planes may be non-parallel, in which case vertical movement of the cutter unit relative to the carrier arm will cause a degree of rotation of the cutter unit 106 about a horizontal axis, which may be permissible in certain applications.

As explained above, the ends of the upper connecting rods 128 are closer together in the mo-plane than the frame plane, and the upper connecting rods 128 therefore converge from the frame plane towards mo-plane. Conversely, the ends of the lower connecting rods 130 are further apart in the mo-plane than the frame plane and the lower connecting rods 130 therefore diverge from the frame plane to the mo-plane. The upper and lower connecting rods 128, 130 therefore act like reversed A-frames, which prevent horizontal movement of the cutter unit 116 relative to the carrier arm 112.

Because the connecting rods 128, 130 are connected to the carrier arm 112 and the mounting structure 134 of the cutter unit 106 via ball joints, the cutter unit 106 is able to rotate relative to the carrier arm about an axis of rotation R that extends approximately in the working direction of the cutter unit. This allows the cutter unit to follow the contours of the ground while working.

Figure 5:
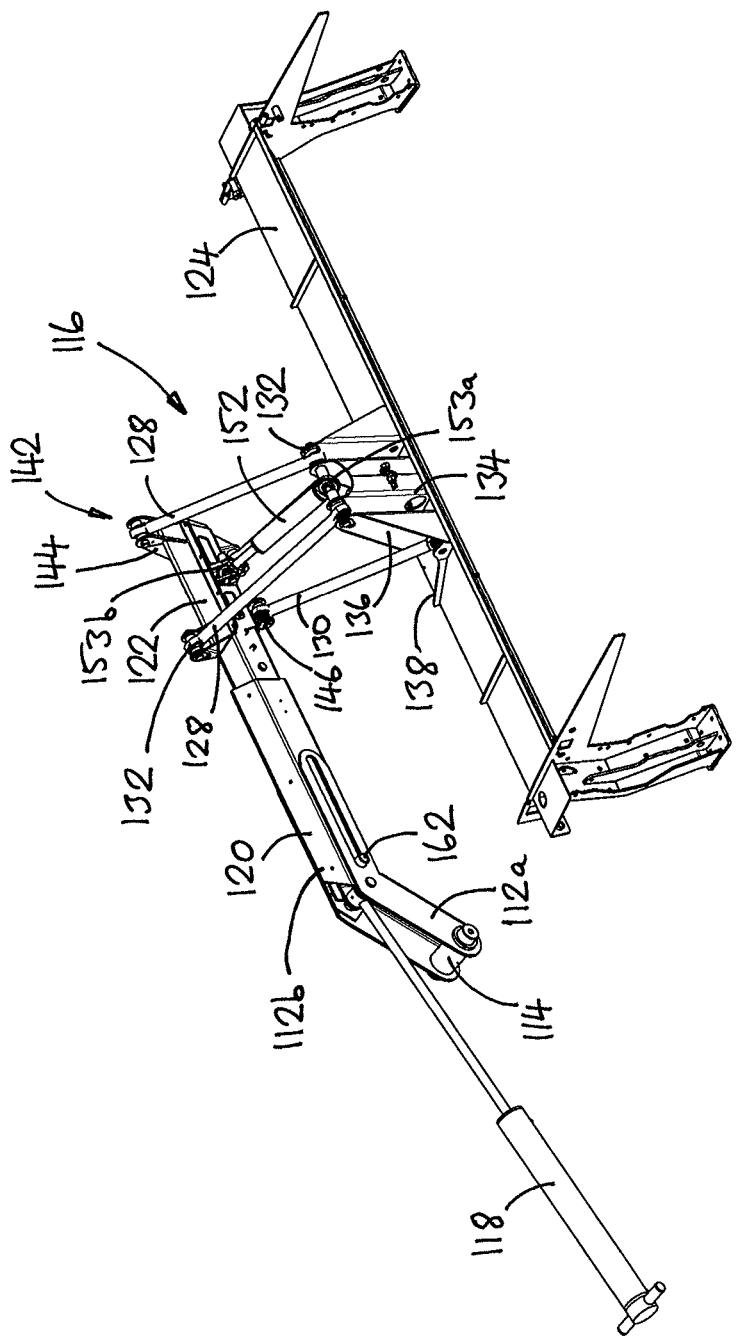
FIG. 5 is an isometric view of a suspension system that forms part of the carrier assembly.

It should be understood that the connecting rod arrangement illustrated in FIGS. 4 and 5 may be inverted, whereby the upper pair of connecting rods 128 diverge from the frame plane to the mo-plane and the lower pair of arms 130 converge from the frame plane to the mo-plane. This does not affect operation of the suspension system 116.

The suspension system 116 also includes an actuator 152 for adjusting the height of the cutter unit 106 relative to the carrier arm 112. In this example, the actuator 152 comprises a hydraulic ram that extends from a first pivot point 153a between the rear ends of the upper connecting rods 128 to a second pivot point 153b between the forward ends of the lower connecting rods 130. In this embodiment the first pivot point 153a and the ball joints 132 at the rear ends of the upper connecting rods 128 are coaxial, the actuator 152 being connected to the cutter unit 106 at the same height as the upper connecting rods 128. By supplying hydraulic fluid to the ram 152 it can be extended thereby lifting the cutter unit 106 to the raised position shown in FIG. 7. Reducing the quantity of hydraulic fluid supplied to the ram 152 allows the cutter unit to fall under gravity to the working position shown in FIG. 8.

The suspension system 116 allows the height of the cutter unit 106 relative to the carrier arm 112 to be adjusted and allows the cutter unit to rotate about an axis R that extends substantially in the working direction D, but does not allow the cutter unit 106 to move laterally relative to the carrier arm (i.e. in a direction that is parallel to the width of the cutter unit). The cutter unit 106 can therefore rotate to accommodate undulations in the surface of the ground. The height of the cutter unit 106 relative to the carrier arm 112 can also be adjusted either to adjust the height of cut of the cutter unit, or to allow the cutter unit to be positioned in a raised headland position as shown in FIG. 3 that allows the tractor to perform a turn at the end of a field.

The suspension system 116 allows the cutter head 106 to move vertically relative to the arm 112. Vertical movement of the cutter head 106 can be accommodated without adjusting any energy accumulators associated with the carrier arm 112, regardless of the length of the arm. The suspension system 116 thus operates independently of any sideshift mechanism for adjusting the length of the carrier arm 112, or the pivot angle of the arm 112 about pivot axis 114, thereby simplifying operation of the machine.

Because the connecting rods 128, 130 are subjected in use only to linear forces (i.e. forces of compression or tension that act along the axes of the connecting rods) and do not experience any bending forces they can be relatively light in weight. At the same time, the risk of damage to the suspension system when the cutter unit collides with an obstruction on the ground is substantially reduced.

When the mowing machine is in the transport configuration shown in FIG. 1, the suspension system 116 supports the entire weight of the cutter unit 106 but prevents movement of the cutter unit in the width direction of the cutter unit. The cutter unit 106 can however move under gravity to a stable position relative to the carrier arm 112. This prevents unwanted movement of the cutter unit 106 during transportation along a road.

Returning to FIGS. 4 and 6, the carrier assembly 108 includes drive mechanism for adjusting the pivot angle of the carrier arm 112 about pivot joint 114, and for adjusting the telescopic extension of the carrier arm 112. This drive mechanism will now be described in more detail. The drive mechanism includes a first actuator 118 for adjusting the pivot angle of the arm 112 about the axis X of pivot joint 114, and a second actuator 123 for adjusting the length of the arm 112. The first and second actuators 118, 123 may for example be hydraulic rams.

The first actuator 118, also called the folding cylinder, is connected between a first mount 160, for example a pivot pin, which is attached to the mounting structure 110, and a second mount 162, for example a second pivot pin, which is attached to the inner part 120 of the arm 112 at the junction of the inner section 112a and the outer section 112b. Extension of the first actuator 118 drives the carrier arm 112 downwards towards the working position, and retraction of the first actuator 118 lifts the carrier arm 112 upwards towards the transport position. In the headland position the arm 112 is lifted only slightly above the working position: for example, the arm 112 may be rotated about the pivot joint 114 through an angle in the range 5°-15° above the working position. The support structure 116 may also be raised when the arm is in the headland position, to increase the clearance between the cutter unit 106 and the ground.

The first actuator 118 is preferably configured to allow stepless adjustment of the pivot angle of the carrier arm 112. This enables the possibility of making small adjustments to the angle of the carrier arm 112, for example to compensate for a loss of pressure in one or more tyres of the carrier vehicle 104. The carrier arm 112 can therefore be maintained in a horizontal position, even if the carrier vehicle is tilting slightly to one side. The term "stepless" as used here is intended to cover both truly stepless adjustments and pseudo-stepless adjustments (i.e. very small finite adjustments) of the length of the actuator 118.

The second actuator 123, also called the sideshift cylinder, is connected between the second mount 162 that is attached to the inner part 120 of the arm 112, and a third mount 164 that is attached to the outer part 122 of the arm 112. It should be noted that the second mount 162 is common to the first actuator 118 and the second actuator 123, thus simplifying the mechanical complexity of the carrier arm. Extension of the second actuator 118 drives the outer part 122 of the carrier arm 112 outwards, increasing the length of the arm, and retraction of the second actuator 118 draws the outer part 122 inwards, decreasing the length of the carrier arm 112.

The outer part 122 of the carrier arm 112 is provided at its inner end with a guide pin 166 that extends outwards through guide slots 168 in the sides of the inner part 120 of the arm. The guide pin 166 and the guide slots 168 help to guide movement of the outer part 122 as the arm 112 extends and retracts.

The guide pin 166 also forms part of a locking mechanism for locking the carrier arm 112 in the transport position. As shown in FIGS. 9-12 the mounting structure 110 carries a pair of locking hooks 170, which are engaged by the ends of the guide pin 166 when the carrier arm 112 is in the transport position to prevent the carrier arm from rotating back towards the working position. Engaging and disengaging the locking mechanism requires the use of both the first and second actuators 118, 123.

The sequence of operations to engage the locking mechanism is shown in FIGS. 9-12. From the working position shown in FIG. 9, the first actuator 118 is activated to lift the carrier arm 112 to the headland position (typically the arm is rotated through a pivot angle of about 15°). The second actuator 123 is then activated to set the telescopic extension of the carrier arm 112 to about 5-15% so that the guide pin 166 is a few centimetres from the inner end of the guide slot 168. The first actuator 118 is then activated to lift the carrier arm 112 to the transport position. These last two operations may alternatively take place simultaneously or in the reverse order. This brings the carrier arm 112 through the intermediate positions shown in FIGS. 10-11 to the transport position shown in FIG. 12.

Figure 10B:
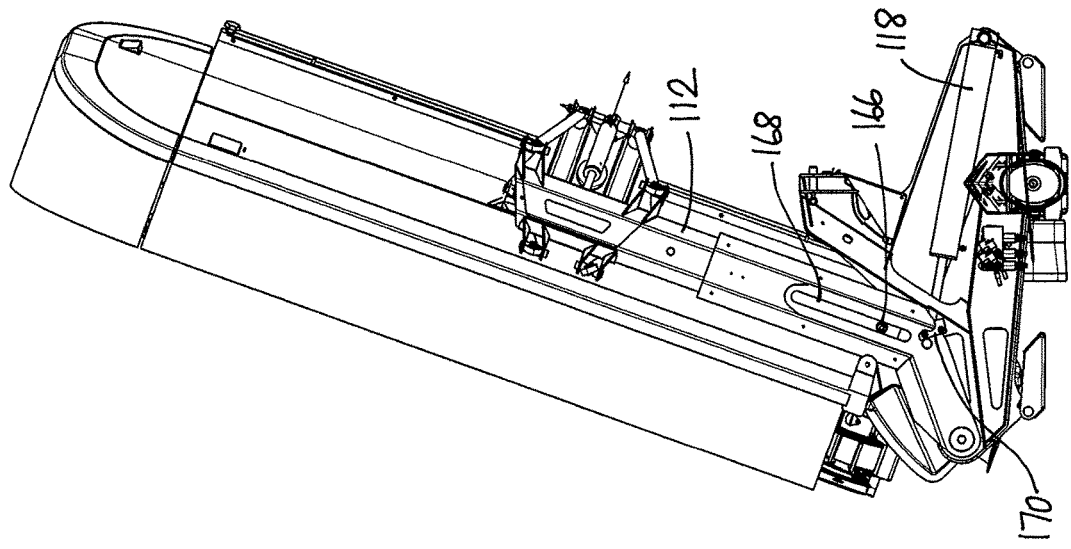
FIG. 10a is a front view and FIG. 10b is a partially sectional front view showing the carrier assembly in a first partially raised condition.
Figure 10A:
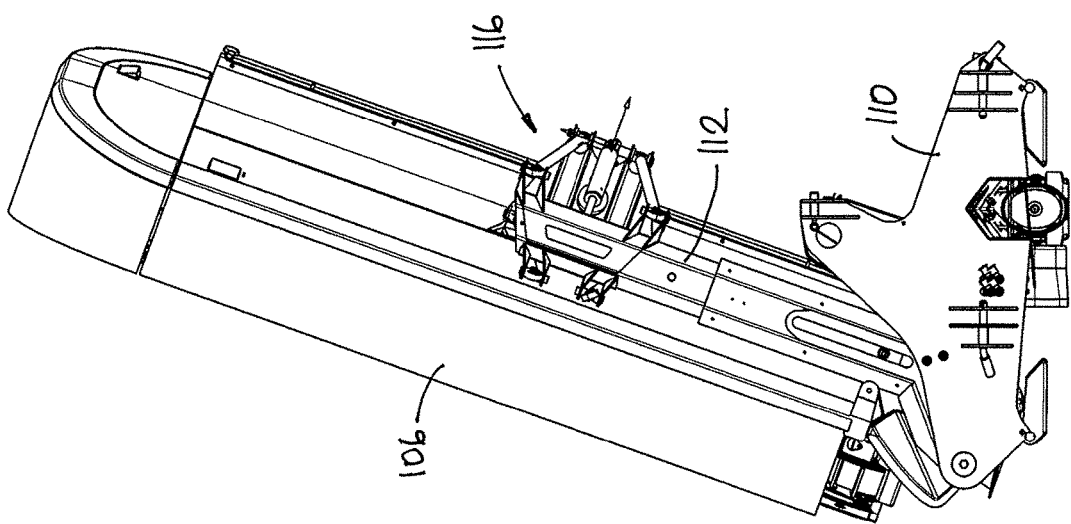
Figure 11B:
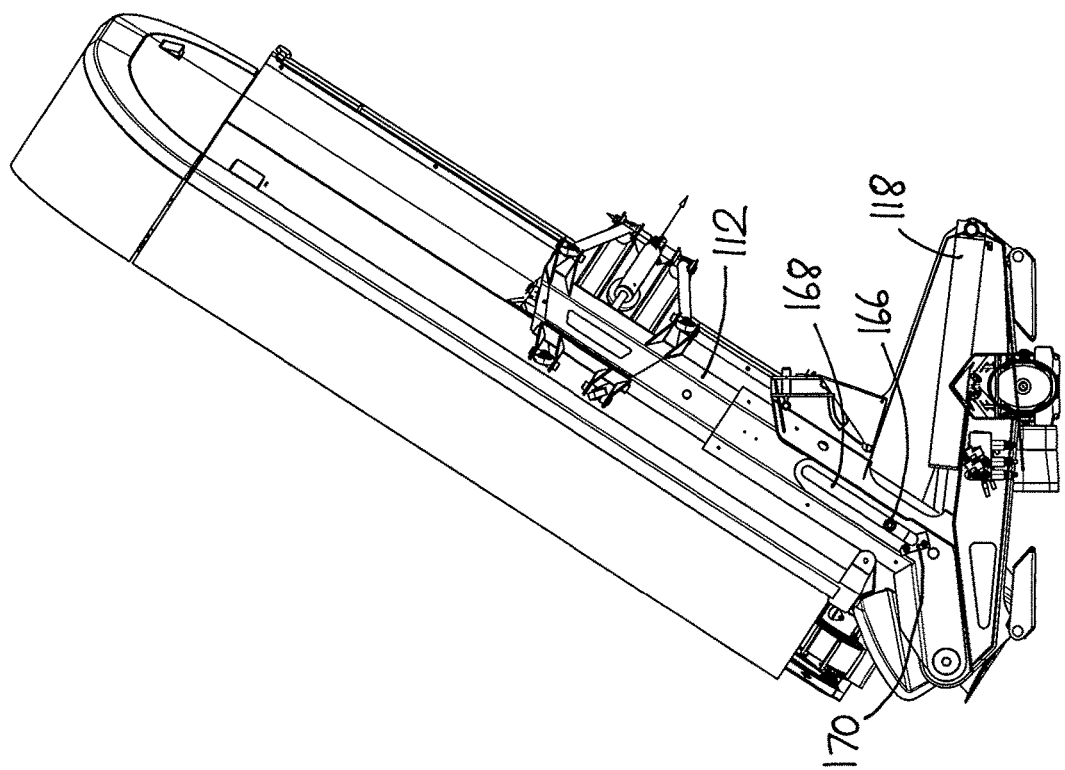
FIG. 11a is a front view and FIG. 11b is a partially sectional front view showing the carrier assembly in a second partially raised condition.
Figure 11A:
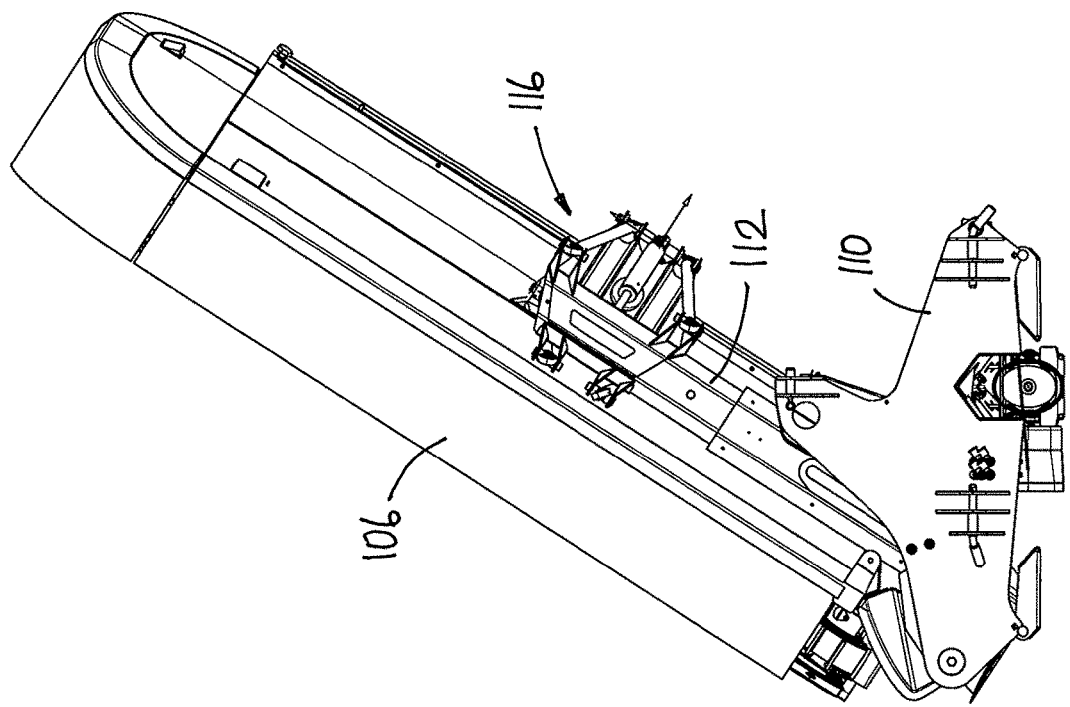
Figure 12B:
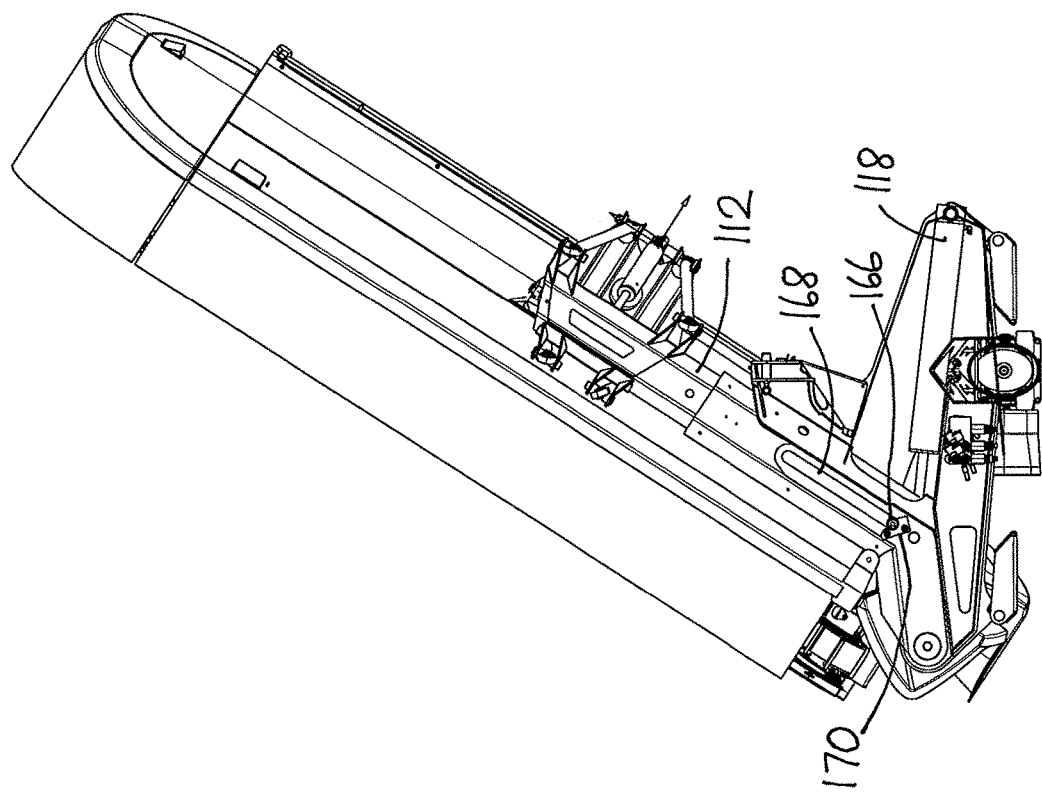
FIG. 12a is a front view and FIG. 12b is a partially sectional front view showing the carrier assembly in a fully raised transport condition.
Figure 12A:
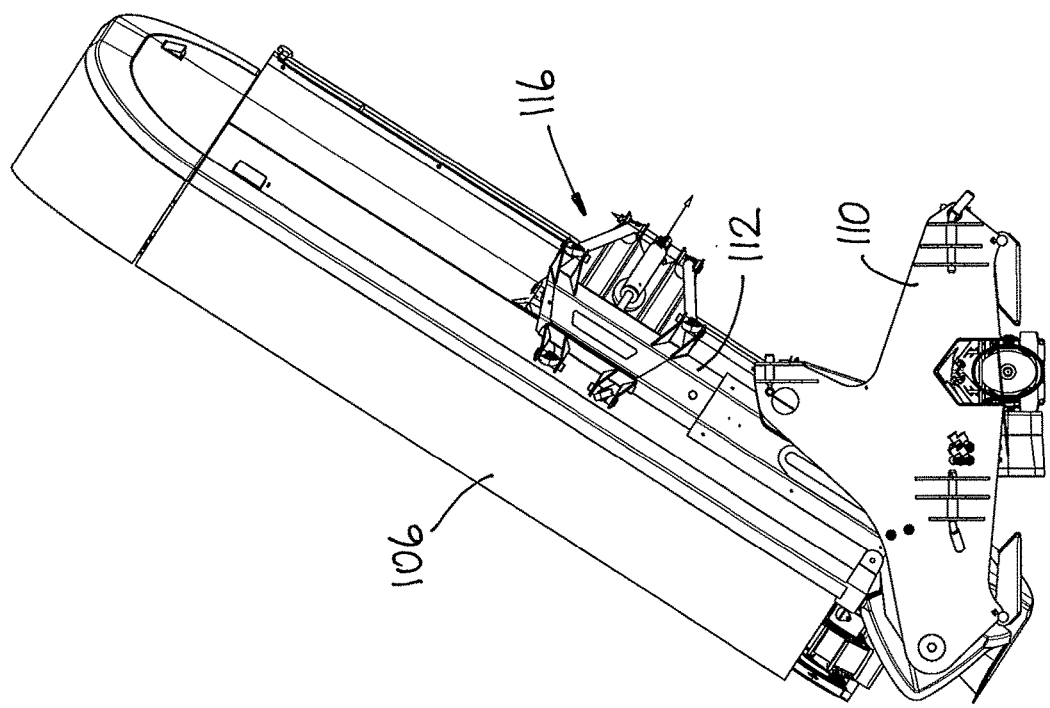

The final stages of the folding operation that brings the carrier arm to the transport position are illustrated in FIGS. 10-12. FIGS. 10a and 10b show the arm in a partially rotated position, in which it has been lifted almost, but not completely, to the transport position. FIGS. 11a and 11b show the arm in a fully rotated position, in which the arm is lifted fully to the transport position but the locking mechanism comprising the guide pin 166 and the locking hooks 170 is not engaged. The second actuator 123 is then activated again to retract the outer part 122 of the arm fully, which brings the guide pin 166 into engagement with the locking hooks 170, as shown in FIGS. 12a and 12b. This locks the carrier arm 112 in the transport position. If the hydraulic system driving the actuators 118, 123 suffers a loss of pressure the locking mechanism 166, 170 will prevent the carrier arm 112 from returning to the working position.

The sequence of operations to disengage the locking mechanism and return the carrier arm to the working position is as follows. First, the second actuator 123 is activated to extend the carrier arm to an extension of about 5-15%. This takes the guide pin 166 out of engagement with the locking hooks 170, thereby releasing the locking mechanism. The first actuator 118 is then activated to lower the carrier arm 112 from the transport position to the working position. If desired, the second actuator 123 may also be activated to adjust the length of the carrier arm 112.

The sequences of operation as described above may, if required, be controlled automatically by a control device, for example a computer. Alternatively, they may be controlled manually. In the case of manual control, the control system may include one or more interlock devices that prevent the operations being carried out in an incorrect sequence. For example, the control system may include an interlock device that prevents the carrier arm being rotated fully to the transport position when the carrier arm is fully retracted telescopically. This ensures that the guide pin 166 does not engage the locking hooks 170 until the carrier arm has been raised fully to the transport position. Alternatively, the locking hooks may be designed to have a cam surface that allows the guide pin to slide over the locking hooks as the arm is moved towards the transport position, so that the guide pin engages the locking hooks to lock the carrier arm 112 when it is in the transport position.

Various modifications of the apparatus described above are of course possible. For example, the arrangement of the connecting rods 128, 130 of the suspension mechanism 116 may be reversed, so that the upper connecting rods 128 diverge from the frame plane towards the mo-plane and the lower connecting rods 130 converge from the frame plane to the mo-plane. The ball joints 132 may also be replaced by any other joints that allow rotation about two orthogonal axes, including for example universal joints (Cardan joints).

The hydraulic actuator 152 may be replaced by any other suitable actuator including, for example, an electric linear motor or a motor driven screw. Alternatively, the actuator 152 may be omitted entirely and the weight of the cutter unit may then be supported by resilient support elements, for example springs or other resilient components.

The suspension mechanism may alternatively be replaced any other suitable mechanism for attaching the operating unit to the carrier arm.

As previously indicated, the invention is not limited to mowing machines but is also applicable to other kinds of agricultural machine including rakes, tedders, seeding machines and soil working machines in which an operating unit is attached to the rear of a tractor 104.

The carrier assembly can be used to mount a single operating unit on one side of a carrier vehicle, or alternatively two operating units may be used to mount operating units on both sides of the vehicle.

The invention claimed is:

1. A carrier assembly for an operating unit of an agricultural machine, the carrier assembly comprising:
   a carrier arm;
   a suspension system for suspending an operating unit from the carrier arm;
   a mounting structure for mounting the carrier arm on a carrier vehicle;
   a pivot mechanism that enables pivoting movement of the carrier arm relative to the mounting structure;
   a first actuator that drives pivoting movement of the carrier arm between a working position and a transport position; and
   a releasable locking mechanism for locking the carrier arm in the transport position, the locking mechanism including a first locking element carried by the mounting structure and a second locking element carried by the carrier arm, the second locking element engageable with the first locking element when the carrier arm is in the transport position,
   wherein the carrier arm includes an inner part, an outer part telescopically extendable and retractable relative to the inner part, and a second actuator that drives the outer part to adjust a length of the carrier arm, and wherein the second locking element is carried by the outer part of the carrier arm and is configured to engage the first locking element when the outer part of the carrier arm is fully retracted relative to the inner part and to disengage the first locking element when the outer part of the carrier arm is extended telescopically relative to the inner part.

2. A carrier assembly according to claim 1 wherein the second locking element is not engageable with the first locking element when the carrier arm is not in the transport position.

3. A carrier assembly according to claim 1 wherein the agricultural machine comprises the carrier vehicle and the operating unit, and wherein the carrier assembly is mounted on the carrier vehicle and carries the operating unit.

4. A carrier assembly according to claim 3 wherein the agricultural machine is a mowing machine and the operating unit is a cutter unit.

5. A carrier assembly according to claim 1 wherein the first locking element comprises a hook element and the second locking element comprises a pin that engages the hook element.

6. A carrier assembly according to claim 1 wherein the first actuator is connected between a first mount attached to the mounting structure and a second mount attached to the inner part of the arm, and the second actuator is connected between the second mount and a third mount attached to the outer part of the arm.

7. A carrier assembly according to claim 1 wherein the suspension system comprises a mounting structure for the operating unit and two pair of connecting rods, the two pair of connecting rods comprising upper pairs of connecting rods and lower pairs of connecting rods, each of the upper pairs of connecting rods and the lower pairs of connecting rods being attached via joints to the mounting structure and the carrier arm, wherein a first pair of the upper pairs of connecting rods and the lower pairs of connecting rods diverge in a working direction of the operating unit and a second pair of the upper pairs of connecting rods and the lower pairs of connecting rods converge in the working direction of the operating unit.

8. A carrier assembly according to claim 7 wherein the suspension system comprises an actuator for adjusting a height of the operating unit relative to the carrier arm.

9. A carrier assembly for an operating unit of an agricultural machine, the carrier assembly comprising:
a carrier arm;
a suspension system for suspending the operating unit from the carrier arm and that allows the operating unit to move vertically relative to the carrier arm;
a mounting structure for mounting the carrier arm on a carrier vehicle;
a pivot mechanism that enables pivoting movement of the carrier arm relative to the mounting structure;
a first actuator that drives pivoting movement of the carrier arm between a working position and a transport position, wherein the carrier arm includes an inner part and an outer part telescopically extendable and retractable relative to the inner part; and
a second actuator that drives the outer part to adjust a length of the carrier arm, wherein the first actuator is connected between a first mount attached to the mounting structure and a second mount attached to the inner part of the arm, and the second actuator is connected between the second mount and a third mount attached to the outer part of the arm, and the second mount comprises a pivot pin common to the first actuator and the second actuator.

10. A carrier assembly according to claim 9 wherein the working position of the carrier arm is adjustable.

11. A carrier assembly according to claim 10 wherein the working position of the carrier arm is adjustable by adjusting the first actuator.

12. A carrier assembly according to claim 11 wherein the first actuator is steplessly or pseudo-steplessly adjustable.

13. A carrier assembly according to claim 9, wherein the agricultural machine comprises the carrier vehicle and the operating unit, and wherein the carrier assembly is mounted on the carrier vehicle and carries the operating unit.

14. A carrier assembly according to the claim 9 wherein the suspension system comprises a mounting structure for the operating unit and two pairs of connecting rods, the two pairs of connecting rods comprising upper pairs of connecting rods and lower pairs of connecting rods, each of the upper pair of connecting rods and the lower pair of connecting rods being attached via joints to the mounting structure and the carrier arm, wherein a first pair of the upper pairs of connecting rods and the lower pairs of connecting rods diverge in a working direction of the operating unit and a second pair of the upper pairs of connecting rods and the lower pairs of connecting rods converge in the working direction of the operating unit.

15. A carrier assembly according to claim 14 wherein the suspension system comprises an actuator adjusting a height of the operating unit relative to the carrier arm.

16. A carrier assembly for an operating unit of an agricultural machine, the carrier assembly including a carrier arm, a suspension system for suspending an operating unit from the carrier arm and that allows the operating unit to move vertically relative to the carrier arm, a mounting structure for mounting the carrier arm on a carrier vehicle, a pivot mechanism that enables pivoting movement of the carrier arm relative to the mounting structure, and a first actuator that drives pivoting movement of the carrier arm between a working position and a transport position, wherein the first actuator is steplessly or pseudo-steplessly adjustable and the working position of the carrier arm is adjustable by adjusting the first actuator.

17. A carrier assembly according to claim 16 wherein the pivot mechanism has a pivot axis extending substantially parallel to a working direction of the agricultural machine.

18. A carrier assembly according to claim 16 wherein the suspension system comprises a mounting structure for the operating unit and two pairs of connecting rods, the two pairs of connecting rods comprising an upper pair of connecting rods and a lower pair of connecting rods, each of the upper pair of connecting rods and the lower pair of connecting rods being attached via joints to the mounting structure and the carrier arm, wherein a first pair of the upper pair of connecting rods and the lower pair of connecting rods diverge in a working direction of the operating unit and a second pair of the upper pair of connecting rods and the lower pair of connecting rods converge in the working direction of the operating unit.

19. A carrier assembly according to claim 18 wherein the suspension system further comprises an actuator for adjusting a height of the operating unit relative to the carrier arm.

20. A carrier assembly according to claim 16, wherein the agricultural machine comprises the carrier vehicle and the operating unit, and wherein the carrier assembly is mounted on the carrier vehicle and carries the operating unit.

* * * * *